UNITED STATES PATENT OFFICE.

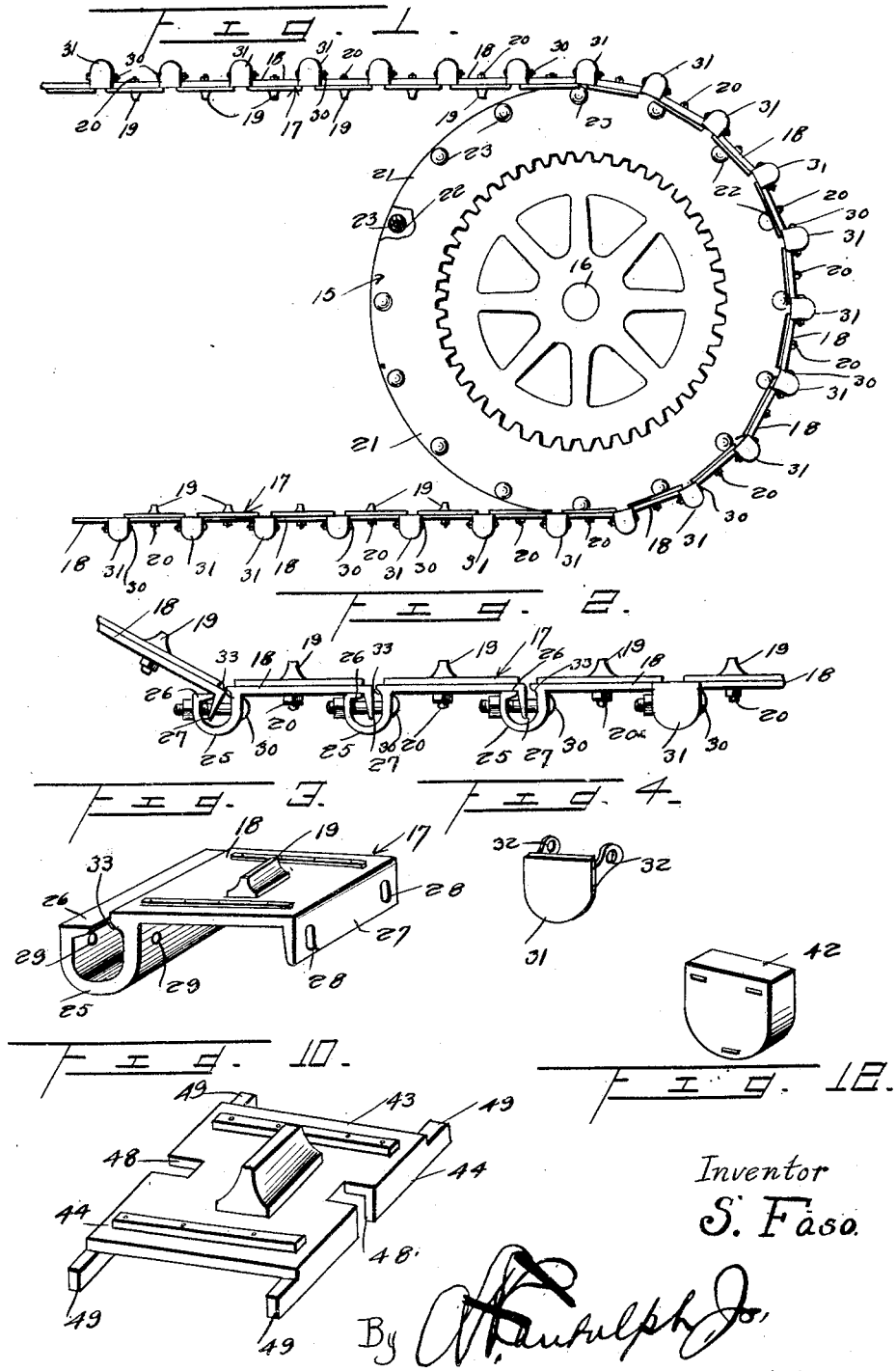

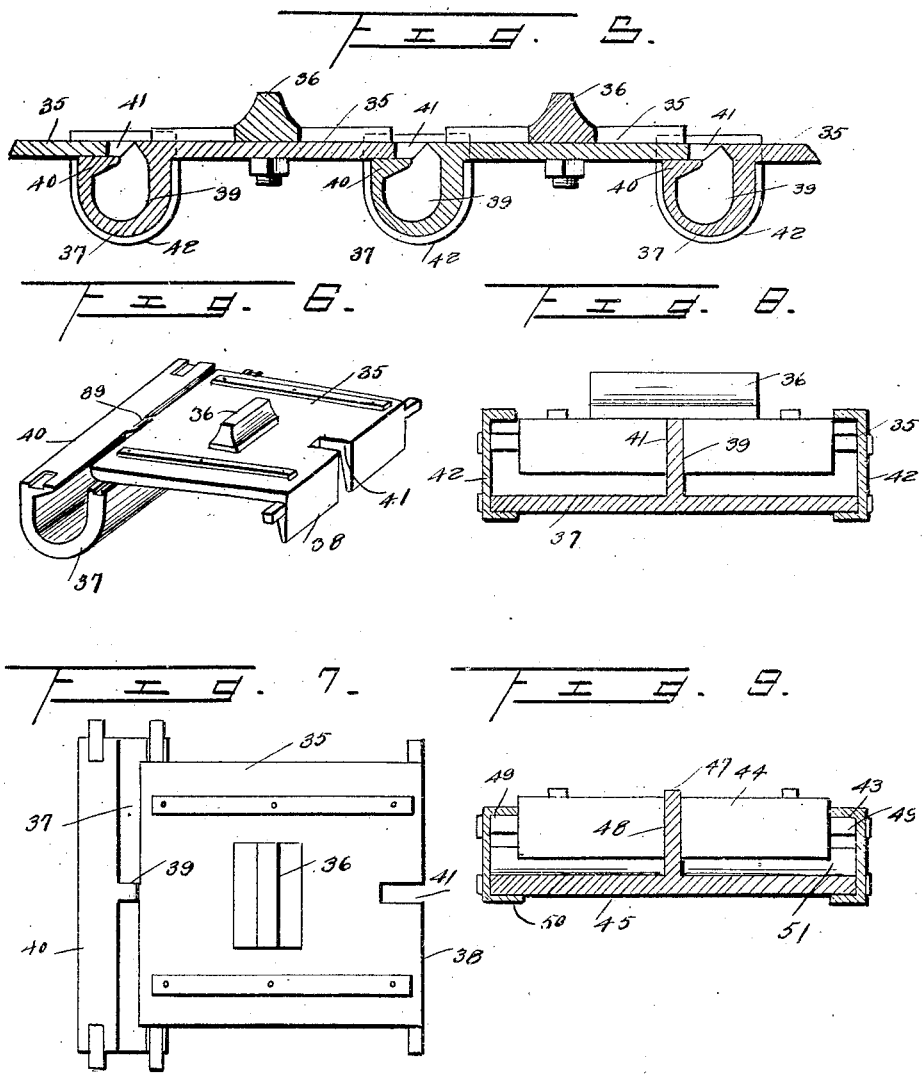

SALVATORE FASO, OF MADERA, CALIFORNIA.

PORTABLE TRACK.

1,364,924. Specification of Letters Patent. Patented Jan. 11, 1921.

Application filed July 1, 1919. Serial No. 308,033.

*To all whom it may concern:*

Be it known that I, SALVATORE FASO, a citizen of the United States, residing at Madera, in the county of Madera and State of California, have invented certain new and useful Improvements in Portable Tracks; and I do hereby declare the following to be a full, clear, and exact description of the invention, such as will enable others skilled in the art to which it appertains to make and use the same.

My invention relates to tracks for tractors and has special reference to the tread means therefor.

An important object of this invention is to provide novel connecting means between the tread elements and the wheels supporting the said elements.

A further object of the invention is to provide novel means for connecting the sections of the tread elements whereby sand and other grit is prevented from lodging between the sections and wearing the same.

A further object of the invention is to provide novel means for connecting the sections of the tread elements without the necessity of using bolts.

A further object of the invention is to provide a caterpillar tractor having a tread element which is easily assembled, simple to apply, and desirable in use.

Other objects and advantages of the invention will be apparent during the course of the following description.

In the accompanying drawings forming a part of this application and in which like numerals are employed to designate like parts throughout the same.

Figure 1 is a fragmentary side elevation of a traction device embodying one form of the invention, parts thereof being broken away, Fig. 2 is a detail side elevation of several of the tread elements illustrating the connecting means therefor, Fig. 3 is a perspective of one of the tread elements illustrating the connecting member formed integrally therewith, Fig. 4 is a perspective of a cap embodied in the invention.

Fig. 5 is a longitudinal section through several tread elements embodied in the invention, the same being slightly modified.

Fig. 6 is a perspective of one of the sections illustrated in Fig. 5,

Fig. 7 is a plan view of several of the sections connected,

Fig. 8 is a vertical transverse sectional view taken through the U-shaped members, Fig. 9 is a transverse section showing a slightly modified form of traction device, Fig. 10 is a perspective of a tread section embodied in the form illustrated in Fig. 9, Fig. 11 is a perspective of one of the connecting members embodied in the form shown in Fig. 9, and, Fig. 12 is a view of a locking member for the form shown in Fig. 9.

In the drawings wherein for the purpose of illustration is shown several preferred embodiments of my invention, the numeral 15 indicates the wheels of a tractor having the usual axle 16. A tread member generally designated by the numeral 17 is arranged about the wheels 15 and includes a plurality of tread sections 18. Lugs 19 extend transversely of the sections 18 and are secured thereto by bolts 20. The lugs 19 are spaced from the longitudinal edges of the sections 18 and are received within recesses 21 of the wheels 15. Rollers 22 are disposed within the recesses 21 and are carried by pins 23 which, as illustrated in Fig. 1, extend transversely of the wheels.

The rollers 22 serve to lessen the friction between the lugs 19 and the walls of the recesses 21.

One end of each tread section 18 is formed integrally with a transversely extending channel plate 25 which as illustrated in Figs. 2 and 3 is U-shaped in cross section. An inwardly extending flange 26 is carried by the free edge portion of each channel plate 25 and is disposed below the horizontal plane of the section 18 and abuts the adjacent end portion of the adjacent section. The adjacent section is provided at one end with a depending attaching plate 27 extending within the channel plate 25. The attaching plate 27 is provided with elongated slots 28 alining with openings 29 in the channel plate 25 and receiving bolts 30 for connecting the sections. As illustrated in Fig. 2, the sections are free to partake of relative movement about the wheels 15 by reason of the elongated slots or openings 28 in the attaching plates 27.

In forming the channel plates 25 integral with each tread section 18, I have found that grit and the like is prevented from working between the channel plates and the tread sections, thereby adding to the efficiency of the tread section and lessening friction. To inclose the ends of the channel plates to prevent the access of dust and so forth to the interior of the same, I have provided caps 31 for the ends of the channel plates and have secured them to the bolts 30 by overlapping apertured ears 32.

As illustrated in Figs. 2 and 3, the portion of each channel plate which is connected to the sections 18 is thickened and curved inwardly as indicated at 33 for strengthening the same and forming a contact surface for the adjacent end of the adjacent section on its pivotal movement.

In the form of my invention illustrated in Figs. 5 to 8 inclusive, I have provided a plurality of tread sections 35 having the lugs 36 attached thereto. The tread sections 35 are formed integral with a transversely extending channel plate 37 which as illustrated in Fig. 6 is U-shaped in cross section. The opposite end of the tread section 35 is provided with a depending attaching plate 38 adapted to be arranged within the channel plate of the adjacent section 35. As illustrated in Fig. 8, a centrally arranged upstanding partition member or wall 39 is provided in the channel plate 37 and has its upper end connecting the upper end of the tread section to an inwardly extending flange 40 carried by the outer end of the channel plate. The attaching plate 38 is provided with a recess 41 receiving the upper portion of the wall 39 for preventing lateral movement of the sections. The plates 38 are extended beyond the longitudinal sides of the sections 35 as are the channel plates 37. Locking loops 42 are adapted to be snugly fitted over the extended portions of the plates 37 and 38 and fastened thereto in any desired manner for locking the same together. The employment of the loops 42 dispenses with the necessity of using bolts for connecting the tread sections. As the outer sides of the channel plates 37 are presented to the ground during the movement of the tractor, the absence of bolts or other projections renders the possibility of breakage and so forth very slight.

In assembling the form of my invention illustrated in Figs. 5 to 8 inclusive, the plates or flanges 38 are inserted within the channel plates of the adjacent sections. The loops are then arranged over the projecting portions of the flanges 37 and 38 and the sections are thereby rigidly connected. By this construction and mode of assembly the plates are free to partake of pivotal movement with relation to each other.

In the form of my invention illustrated in Figs. 9 to 12 inclusive, I have provided a plurality of tread sections 43 having their longitudinal ends provided with depending attaching plates 44.

Channel plates 45 clearly illustrated in Fig. 11 are substantially U-shape in cross section and are provided at their upper ends with inwardly extending flanges 46. A centrally arranged transverse wall 47 is formed integral with the channel plates and has its upper end extending above the plane of the flanges 46. The wall 47 strengthens the channel plates and is received within recesses 48 of the depending plates 44 for preventing lateral movement of the sections 43. The depending plates 44 are extended beyond the longitudinal edges of the sections 43 as indicated at 49 and are received within loops 50 as are the end portions of the channel plates 45. The application of the loops 50 to the end portions of the channel plates 45 and the extensions 49 serve to connect the tread sections and permit of the free pivotal movement of the same.

As illustrated in Fig. 12, the loops 50 are substantially U-shaped in cross section and are adapted to snugly fit over the end portions of the channel plates 45 and the extensions 49 are prevented from accidental displacement by reason of their engagement with the channel plates.

The channel plate 45 is provided in its lower portion with an upstanding shoulder 51 adapted to be engaged by the depending plates 44.

In assembling the form of my invention illustrated in Figs. 9 to 12 inclusive, the depending plates 44 are embedded within the channel plates 45 and the loops 50 are then positioned over the extensions 49 and the end portions of the channel plates for securely connecting the sections.

While I have shown and described the preferred embodiment of my invention, it is understood that such minor changes in arrangement and construction of parts may be made as will remain within the spirit of the invention and the scope of the appended claims.

Having thus described my invention, what I claim is:—

1. A traction device including tread sections, transversely extending channel plates formed integral with said tread sections, attaching plates carried by said sections and arranged within the channel plates of the adjacent sections, and means to secure the attaching plates within the channel plates.

2. The construction set forth in claim 1, and inwardly extending flanges carried by one upper edge of each channel plate and engaging the adjacent tread section.

3. A traction device including tread sections, transversely extending channel plates formed integral with said sections, depending attaching plates carried by said sections and arranged within the channel plates of the adjacent sections, inwardly extending flanges carried by one edge of said channel plates and disposed below the plane of said tread sections and engaging the adjacent tread sections, the sides of said channel plates which are formed integral with said tread sections being thickened and curved inwardly, and means to connect said channel plates and said attaching plates.

4. A traction device including tread sections, transversely extending channel plates formed integral with said tread sections, attaching plates depending from the ends of said tread sections and arranged within said channel plates, said channel plates and said attaching plates having alining openings, and bolts extended through said alining openings for connecting the tread sections.

5. A traction device including tread sections, transversely extending channel plates formed integral with said tread sections, attaching plates carried by said tread sections and arranged within the channel plates of the adjacent sections, and having elongated openings therein, said channel plates being provided with openings alining with the elongated openings, bolts extended through said alining openings for connecting the channel and attaching plates, and caps arranged over the ends of the channel plates inclosing the same.

6. A traction device including tread sections, channel plates arranged at the ends of the tread sections and being U-shaped in cross section, depending attaching plates carried by the tread sections and arranged within the channel plates of the adjacent sections, said channel plates and said attaching plates having alining openings therein, bolts extending through said alining openings for connecting the sections, caps arranged over the ends of the channel plates for inclosing the same, and apertured ears formed integral with said caps and receiving said bolts for securing the caps in position.

In testimony whereof I affix my signature in presence of two witnesses.

SALVATORE FASO.

Witnesses:
VINCENT FASO.
SEBASTIAN FASO.